US008896441B2

(12) United States Patent
Mohandes

(10) Patent No.: US 8,896,441 B2
(45) Date of Patent: *Nov. 25, 2014

(54) SYSTEM AND METHOD FOR TRACKING PEOPLE

(71) Applicant: King Fahd University of Petroleum and Minerals, Dhahran (SA)

(72) Inventor: Mohamed Mohandes, Dhahran (SA)

(73) Assignee: King Fahd of Petroleum and Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 13/936,112

(22) Filed: Jul. 5, 2013

(65) Prior Publication Data

US 2013/0293377 A1    Nov. 7, 2013

Related U.S. Application Data

(63) Continuation-in-part of application No. 12/970,714, filed on Dec. 16, 2010, now abandoned.

(51) Int. Cl.
*G08B 1/08* (2006.01)
*G08B 26/00* (2006.01)
*G01S 19/14* (2010.01)
*G08B 21/02* (2006.01)

(52) U.S. Cl.
CPC .............. *G08B 26/007* (2013.01); *G01S 19/14* (2013.01); *G08B 21/0275* (2013.01)
USPC .................. 340/539.13; 701/468; 340/573.1; 342/73; 342/357.71

(58) Field of Classification Search
CPC .................. G06K 2017/0045; G06K 7/10128; G08B 13/2462; G08B 21/0202; G08B 21/0269; H04W 64/00; H04W 4/026; H04W 4/027; H04W 4/028; G06Q 20/388; G06Q 20/3278; G06Q 20/341

USPC ......... 340/539.1, 539.11, 539.13, 539.2, 540, 340/572.1–572.9, 10.1; 455/456.1, 457, 455/41.2, 41.3, 556.1; 701/468, 469; 342/73, 357.39, 357.63, 357.71
See application file for complete search history.

(56) References Cited

U.S. PATENT DOCUMENTS

| | | | |
|---|---|---|---|
| 6,243,039 B1 * | 6/2001 | Elliot | ............................ 342/457 |
| 6,339,397 B1 | 1/2002 | Baker | |
| 6,362,778 B2 | 3/2002 | Neher | |
| 7,015,817 B2 | 3/2006 | Copley et al. | |
| 7,181,228 B2 | 2/2007 | Boesch | |

(Continued)

*Primary Examiner* — George Bugg
*Assistant Examiner* — Edny Labbees
(74) *Attorney, Agent, or Firm* — Richard C. Litman

(57) ABSTRACT

The system and method for tracking people provides for the tracking of individuals in large crowds, such as the tracking of individual pilgrims during the Hajj pilgrimage in Mecca. A polling request is initially transmitted from a tracking station to a mobile device associated with a particular person of interest. Upon receipt of the polling request, a location signal is transmitted back to the tracking station. The location signal includes positional and time data representative of the location of the mobile device at the time of transmission. Additionally, a supplemental location signal is also transmitted to the tracking station, the supplemental location signal being representative of the location of the mobile device when the mobile device is detected within proximity of a fixed sensor. A visual display image of the path of the person of interest is then displayed at the tracking station overlaid on a geographic map.

20 Claims, 4 Drawing Sheets

(56) References Cited

U.S. PATENT DOCUMENTS

| | | |
|---|---|---|
| 7,248,160 B2 | 7/2007 | Mangan et al. |
| 7,353,034 B2 | 4/2008 | Haney |
| 7,660,872 B2 | 2/2010 | Delia et al. |
| 8,190,129 B2 * | 5/2012 | Ben Ayed .................... 455/411 |
| 2007/0013526 A1 * | 1/2007 | Kazdin et al. .............. 340/573.4 |
| 2008/0291022 A1 | 11/2008 | Amador et al. |
| 2009/0040048 A1 | 2/2009 | Locker et al. |
| 2010/0022255 A1 * | 1/2010 | Singhal ........................ 455/457 |
| 2011/0080262 A1 * | 4/2011 | Richardson et al. .......... 340/8.1 |

* cited by examiner

SYSTEM AND METHOD FOR TRACKING PEOPLE

CROSS-REFERENCE TO RELATED APPLICATION

This application is a continuation-in-part of U.S. patent application Ser. No. 12/970,714, filed Dec. 16, 2010.

BACKGROUND OF THE INVENTION

1. Field of the Invention

The present invention relates to monitoring and tracking, and particularly to a system and method for tracking people in large crowds, such as during the Hajj pilgrimage.

2. Description of the Related Art

The Hajj is a pilgrimage to Mecca to be performed at least once in a Muslim's lifetime. The Hajj is performed within a six-day period each year within designated boundaries inside the city of Mecca. Over 2.5 million pilgrims visit Mecca each year, the pilgrims all congregating within a relatively small region. An additional 4 million visitors come to Mecca at other times of the year. During this time, a number of visitors to Mecca are, instead, attempting to obtain employment and stay in Saudi Arabia illegally. Due to the overwhelming crowd visiting Mecca during this time, it is nearly impossible to regulate all of the visitors to prevent acts of illegal immigration.

It would be of great benefit to authorities to be able to track visitors during the Hajj. Although visual tracking, the use of checkpoints, increased numbers of police officers and officials, and other conventional crowd control methods are presently used, the sheer number of visitors to Mecca within such a small region makes such supervision relatively ineffective. Thus, a system and method for tracking people solving the aforementioned problems is desired.

SUMMARY OF THE INVENTION

The system and method for tracking people provides for the tracking of individuals in large crowds, such as the tracking of individual pilgrims during the Hajj pilgrimage in Mecca. A polling request is initially transmitted from a base or tracking station to a mobile device, such as a cellular telephone, personal digital assistant or the like, associated with a particular person of interest. Preferably, the polling request includes identification data associated with the mobile device of the person of interest. Upon receipt of the polling request, a location signal is transmitted from the mobile device back to the base or tracking station. The location signal includes positional data and time data representative of the location of the mobile device at the time of transmission of the location signal. Preferably, the mobile device is equipped with a global positioning system (GPS) receiver, allowing the mobile device to receive signals from the global positioning system and calculate the geographic position of the mobile device.

Additionally, a supplemental location signal is also transmitted to the base or tracking station. The supplemental location signal includes supplemental positional data and supplemental time data representative of the location of the mobile device when the mobile device is detected within proximity of a fixed sensor. Preferably, the mobile device has a radio frequency identification (RFID) chip embedded therein, and the fixed sensor is a radio frequency sensor. The RFID chip is encoded with the identification data of the mobile device's user, allowing the position of the nearest radio frequency sensor to be recorded as the approximate position of the person of interest. The positional data and time data, along with the supplemental positional data and the supplemental time data, are recorded in a database as a set of geographic positions and corresponding times associated with a path of the person of interest. A visual display image of the path of the person of interest is then displayed at the base or tracking station, the path being overlaid on a geographic map.

Preferably, an icon representing the person of interest at each recorded position thereof on the path of the person of interest is displayed on the geographic map. Preferably, each icon is initially displayed in a first color. If a location signal is not received at the base or tracking station following transmission of the polling request, and if an updated supplemental location signal is also not received, then the icon associated with the person of interest's last known position is displayed in a second color distinct from the first color. For example, if the person of interest goes inside a building with no cellular service, or has traveled outside of the general geographic area of interest, then the icon representing the last known position would be displayed in a different color on the display at the base or tracking station.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
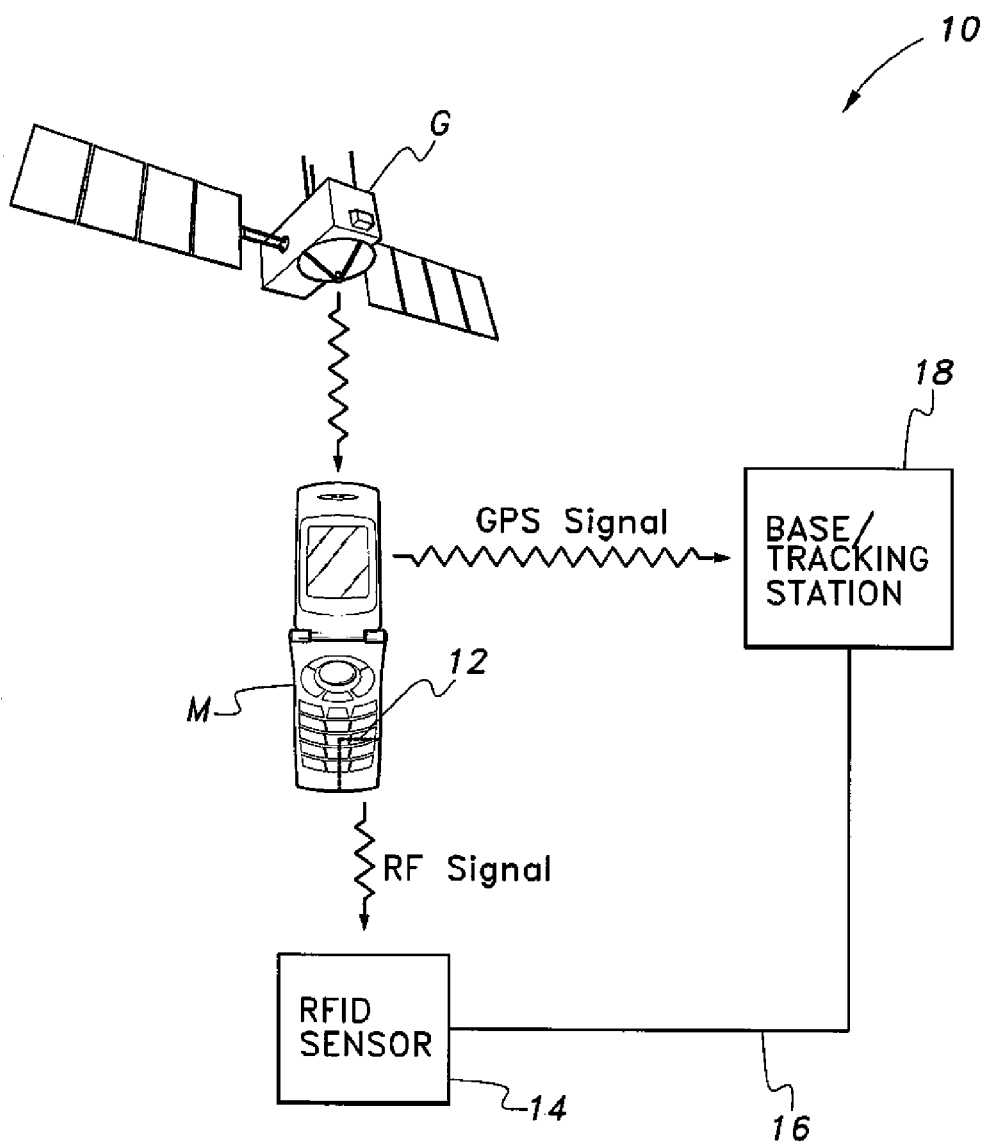
FIG. 1 is a diagram of a system for tracking people according to the present invention.

The system and method for tracking people provides for the tracking of individuals in large crowds, such as the tracking of individual pilgrims during the Hajj pilgrimage in Mecca. A polling request is initially transmitted from a base or tracking station 18 to a mobile device M, such as a cellular telephone, personal digital assistant or the like, associated with a particular person of interest. In FIG. 1, the mobile device M is shown as an exemplary cellular telephone, although it should be understood that system 10 may be used in combination with any desired mobile device capable of receiving and transmitting signals.

Preferably, the polling request includes identification data associated with the mobile device M of the person of interest. The polling request may be transmitted manually, at any desired time, or may be transmitted automatically at predetermined time intervals, such as once every five minutes or once every hour. Upon receipt of the polling request, a location signal is transmitted from the mobile device M back to the base or tracking station 18. The location signal includes positional data and time data representative of the location of the mobile device M at the time of transmission of the location signal. Preferably, the mobile device M is equipped with a global positioning system (GPS) receiver, allowing the mobile device to receive signals from the global positioning system (represented generally as G in FIG. 1) and calculate the geographic position of the mobile device M. As an alternative to the polling request, the mobile device M could be pre-programmed to transmit the location signal at a pre-set time interval without the necessity of polling. In this alternative, upon arrival at the desired location, such as, for example, arrival in the Kingdom of Saudi Arabia at the time of the Hajj, the cellular telephone or other mobile device M of each pilgrim will be loaded with software which automatically transmits the location information periodically to the base station 18.

Additionally, a supplemental location signal is also transmitted to the base or tracking station 18. The supplemental location signal includes supplemental positional data and supplemental time data representative of the location of the mobile device M when the mobile device is detected within proximity of a fixed sensor 14. Preferably, the mobile device M has a radio frequency identification (RFID) chip 12 embedded therein, and the fixed sensor 14 is a radio frequency sensor, as shown. It should be understood that any suitable type of proximity sensor may be utilized. The RFID chip 12 is encoded with the identification data of the mobile device's user, allowing the position of the nearest radio frequency sensor 14 to be recorded as the approximate position of the person of interest. As opposed to conventional RFID systems, in which personal information such as contact numbers, addresses, medical records, etc., which use RFID tags embedded in wristbands or the like, the present system preferably utilizes RFID chip 12 embedded within the mobile device M, thus minimizing the possibility of loss or accidental damage to the RFID chip.

In FIG. 1, the RFID sensor 14 is shown as being in communication with the base or tracking station 18 through a hard line 16. It should be understood that both the location signal and the supplemental location signal may be transmitted to the base or tracking station 18 via any suitable type of interface, such as a hard line, a wireless connection, a wireless mobile network, a local area network or a wide area network, such as the Internet. In the particular example of users within the city of Mecca during the Hajj, each pilgrim during the Hajj typically must have a Hajj permit, with numerous checkpoints being organized and formed throughout the city. RFID sensors 14 may be located at these already designated checkpoints, thus minimizing the need for costly and complex construction of new systems within the city.

Figure 2:
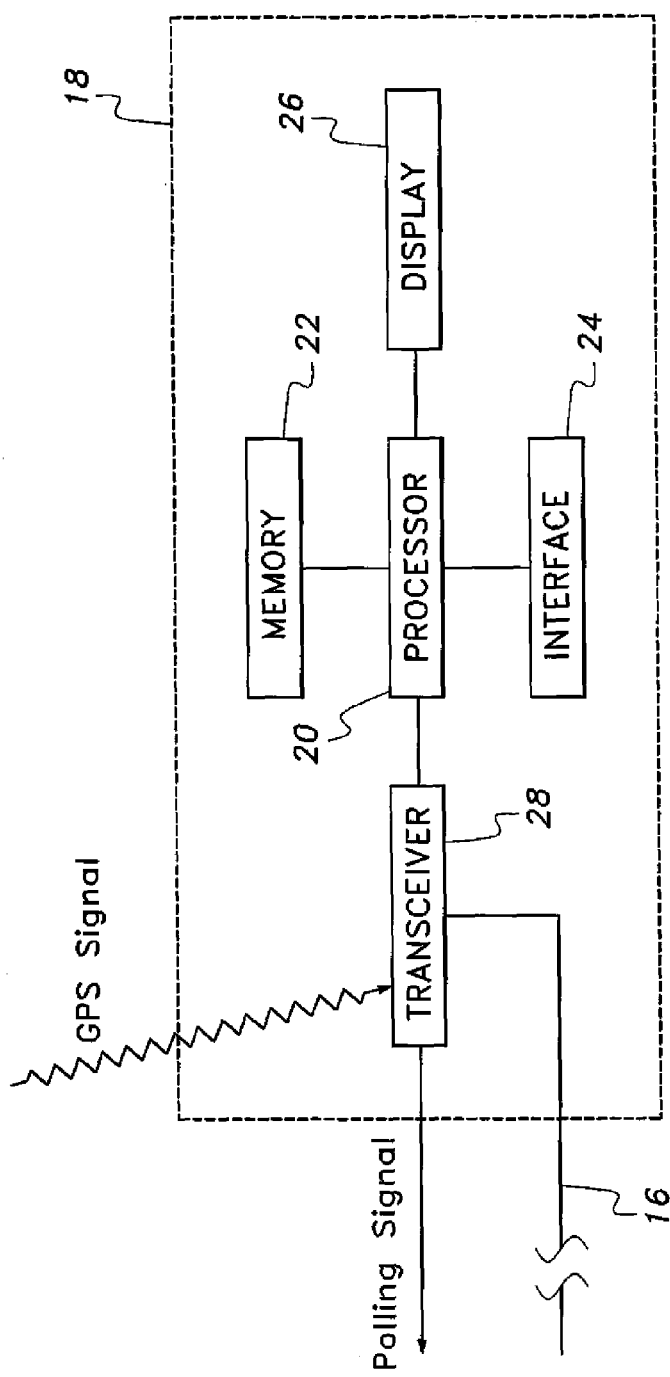
FIG. 2 is a block diagram of base tracking station components in a system for tracking people according to the present invention.

FIG. 2 diagrammatically illustrates system components of the base or tracking station 18. The polling signal is transmitted by a transceiver 28, which may be any suitable type of transceiver, and the location signal and the supplemental location signal are also both received by the transceiver 28. Additional data is entered into the system via any suitable type of user interface 24, and may be stored in memory 22, which may be any suitable type of computer readable and programmable memory. Calculations are performed by a processor 20, which may be any suitable type of computer processor and may be displayed to the user on display 26, which may be any suitable type of computer display.

The processor 20 may be associated with, or incorporated into, any suitable type of computing device, for example, a personal computer or a programmable logic controller. The display 26, the processor 20, the computer readable memory 22, the transceiver 28 and any associated computer readable recording media are in communication with one another by any suitable type of data bus, as is well known in the art.

Examples of computer-readable recording media include non-transitory storage media, a magnetic recording apparatus, an optical disk, a magneto-optical disk, and/or a semiconductor memory (for example, RAM, ROM, etc.). Examples of magnetic recording apparatus that may be used in addition to memory 22, or in place of memory 22, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

The positional data and time data, along with the supplemental positional data and the supplemental time data, are recorded in a database, or stored in memory 22 as a set of geographic positions and corresponding times associated with a path of the person of interest. A visual display image of the path of the person of interest is then displayed on display 26 at the base or tracking station 18, the path being overlaid on a geographic map.

Figure 3:
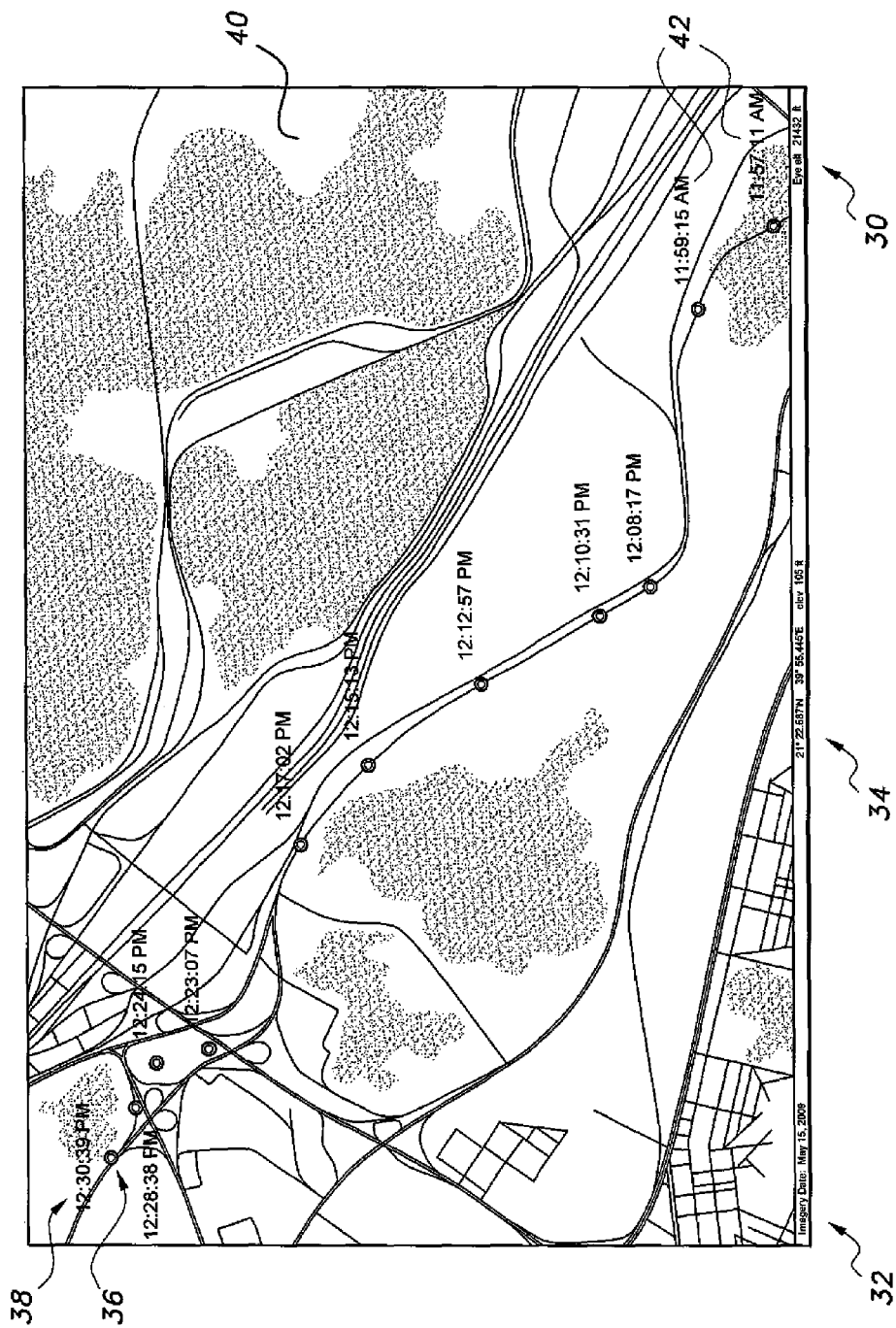
FIG. 3 is an exemplary map display generated by the system for tracking people according to the present invention.

FIG. 3 illustrates an exemplary map display 30, displayed to a user at the base or tracking station 18 on display 26. The processor 20 generates the visual display image of the path of the person of interest overlaid on a geographic or topological map image 40. The display image 30 preferably includes the date 32, the general location 34 of the map image 40, and the present time 42. As shown, an icon 36 representing the person of interest at each recorded position of the person of interest on the person of interest's path is overlaid on map image 40. A time code 38 is displayed adjacent each icon 36, showing the position of the person of interest for each polled time.

Preferably, each icon 36 is initially displayed in a first color. If a location signal is not received at the base or tracking station following transmission of the polling request, and if an updated supplemental location signal is also not received, then the icon associated with the person of interest's last known position is displayed in a second color distinct from the first color. For example, if the person of interest goes inside a building with no cellular service, or has traveled outside of the general geographic area of interest, then the icon representing the last known position would be displayed in a different color on the display 26 at the base station 18. As an alternative, the icon representing the last known position could flash, rather than changing color. As a further alternative, when pilgrims are divided into groups according to the region they come from, each group is typically assigned to a single guide (referred to as a "mutawif"). In this situation, the icons displayed on the geographic map representing pilgrims of each group will have a unique color associated with the particular group. This aids the guide and the authorities in locating pilgrims of a specific group for purposes of crowd management and ease for the guide in locating members of his particular group.

Although the system 10 in FIG. 1 is shown with only a single mobile device M being in communication with the base or tracking station 18, it should be understood that this is for purposes of simplification only. The system 10 is adapted for use with large crowds, such as the Hajj pilgrimage in Mecca, which receives over 2.5 million pilgrims per year, all traveling within a relatively small city. Preferably, a large fraction of the pilgrims would be provided with mobile devices M, each being adapted for receiving the polling signal and transmitting the location and supplemental location signals. Similarly, although only a single RFID sensor 14 is shown, it should be understood that such sensors would preferably be arranged in a grid throughout the city. As described above, each mobile device has an identifier associated therewith, allowing the base or tracking station to send a polling signal directed at only one mobile device M, and also allowing each RFID sensor 14 to distinguish the person who is traveling in proximity thereto. During the Hajj, each group of pilgrims (typically numbering a few thousand) typically has a guide, referred to as a "Mutawif" in Arabic. In addition to tracking the pilgrims at base station 18, the location information received and calculated at the base station 18 could be re-transmitted to the guide, allowing the guide to have a visual representation of the locations of each member of his group, thus ensuring that pilgrims do not get lost as they navigate through the city.

Figure 4:
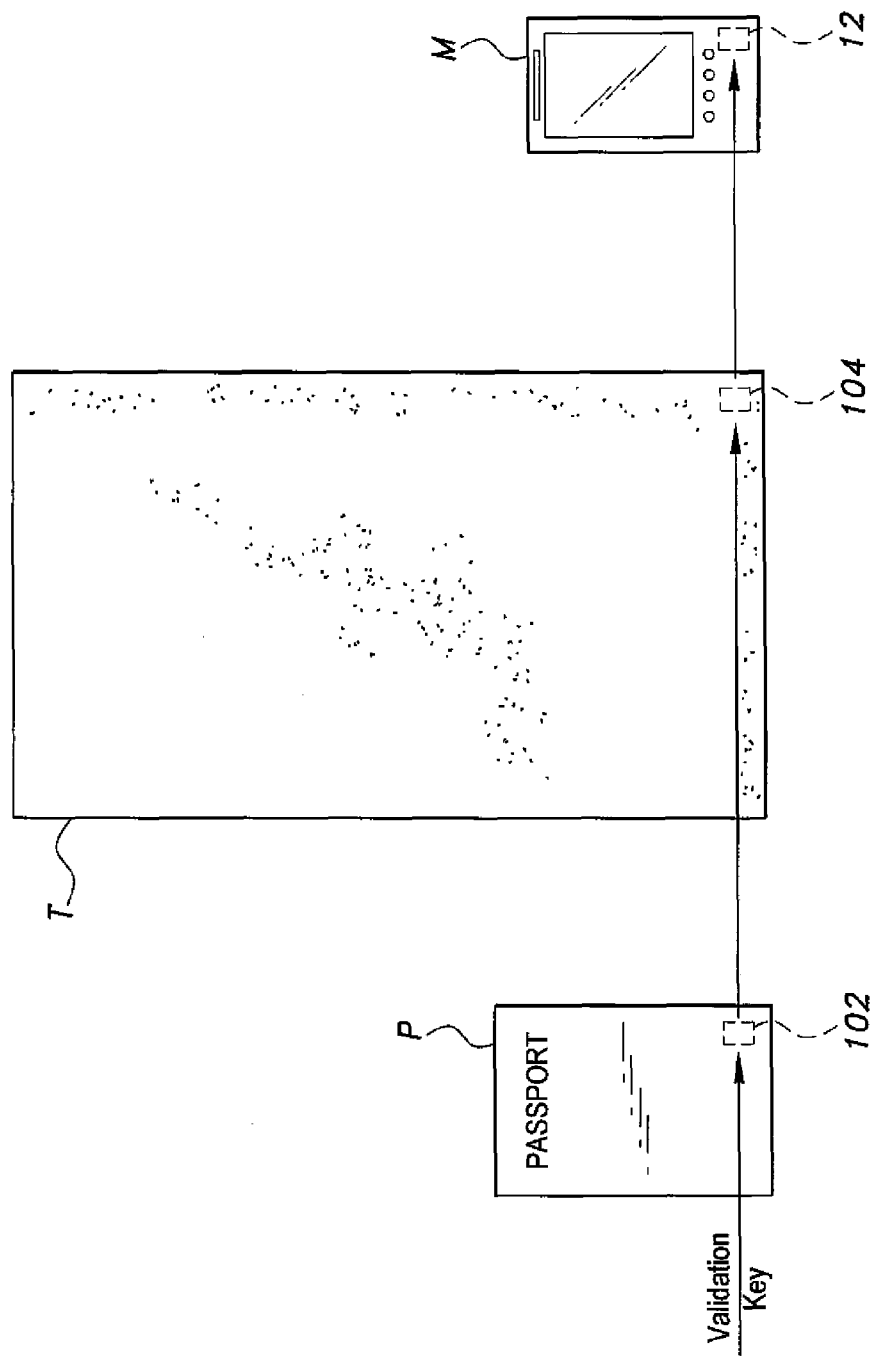
FIG. 4 is a schematic diagram showing an alternative embodiment of a system and method for tracking people according to the present invention.

As a further alternative, the identification data may also be supplemented with a digital validation key, which is used to validate authorized usage of the system and also to validate that the user has legally entered the country. As illustrated in FIG. 4, at the time of entry into the country, the digital validation key is preferably recorded on a first portable memory device 102, which may be embedded in the user's passport P, for example. The first portable memory device 102 may be an RFID chip, similar to RFID chip 12, or may be any other suitable type of computer readable memory or storage, such as flash memory or the like. Preferably, the digital validation key is only valid in this form (i.e., stored on first portable memory device 102) for a set period of time. Before the time expires, the digital validation key must be transferred to a second portable memory device 104.

In FIG. 4, the second portable memory device 104 is shown as being embedded in a towel T. During the Hajj, there is traditionally a three-day period during which the pilgrim does not wear regular clothing. Rather, the pilgrim often wraps a towel around his upper body and covers his lower body with a second towel. Thus, it is preferable for this particular application to embed the second portable memory device 104 in a towel, or any other suitable type of wrap or pilgrimage-related garment. Similar to first portable memory device, the second portable memory device 104 may be an RFID chip, similar to RFID chip 12, or may be any other suitable type of computer readable memory or storage, such as flash memory or the like. Once transferred to second portable memory device 104, the digital validation key has a second time limit before expiring, such as the three-day period during which the pilgrim will be wearing the towel T. Prior to the expiration of the second time limit, the digital validation key is transferred from the second portable memory device 104 into the RFID chip 12 of the mobile device M, where operation continues as detailed above.

It should be understood that the mobile device M may include additional functions, such as a call for emergency aid that would include the user's position, or any other suitable type of geographically dependent function typically associated with GPS-enabled mobile devices.

It is to be understood that the present invention is not limited to the embodiments described above, but encompasses any and all embodiments within the scope of the following claims.

I claim:

1. A method of tracking people, comprising the steps of:
recording a digital validation key on a first portable memory device;
transferring the digital validation key to a second portable memory device, wherein the digital validation key is valid only if transferred to the second portable memory device within a first pre-set time period;
transferring the digital validation key to a mobile device associated with a particular person of interest, wherein the digital validation key is valid only if transferred to the mobile device from the second portable memory device within a second pre-set time period;
transmitting a polling request to the mobile device associated with the particular person of interest;
in response to the polling request, receiving a location signal including positional data and time data representative of the location of the mobile device at the time of transmission of the location signal by the mobile device;
receiving a supplemental location signal from a fixed sensor, the supplemental signal including supplemental positional data and supplemental time data representative of the location of the mobile device when the mobile device is detected within proximity of a fixed sensor;
recording the positional and time data and the supplemental positional and supplemental time data in a database as a set of geographic positions and corresponding times associated with a path of the person of interest;
generating a visual display image of the path of the person of interest overlaid on a geographic map; and
transmitting the positional and time data and the supplemental positional and supplemental time data to a single guide of a group of people, the group of people including the person of interest.

2. The method of tracking people as recited in claim 1, wherein the step of transmitting the polling request includes transmitting identification data associated with the mobile device of the person of interest.

3. The method of tracking people as recited in claim 2, wherein the step of generating the visual display image includes displaying an icon representing the person of interest at each recorded position of the person of interest on the path of the person of interest.

4. The method of tracking people as recited in claim 3, wherein the step of generating the visual display image further includes displaying the time data associated with each recorded position, the time data being displayed adjacent the respective icon associated therewith.

5. The method of tracking people as recited in claim 4, wherein the step of generating the visual display image includes displaying each said icon in a first color, wherein if a location signal is not received following transmission of the polling request and an updated supplemental location signal is not received, then causing the icon associated with the person of interest's last known position to flash.

6. The method of tracking people as recited in claim 5, further comprising the steps of:
receiving GPS positional data of the mobile device from the global positioning system; and
generating the positional data based upon the GPS positional data.

7. The method of tracking people as recited in claim 6, wherein the fixed sensor comprises an RFID receiver, the supplemental positional data and supplemental time data being generated upon detection of an RFID chip embedded in the mobile device in proximity of a fixed radio frequency sensor.

8. A method of tracking people, comprising the steps of:
recording a digital validation key on a first portable memory device;
transferring the digital validation key to a second portable memory device, wherein the digital validation key is valid only if transferred to the second portable memory device within a first pre-set time period;
transferring the digital validation key to a mobile device associated with a particular person of interest, wherein the digital validation key is valid only if transferred to the mobile device from the second portable memory device within a second pre-set time period;
transmitting a polling request to the mobile device associated with the particular person of interest;

in response to the polling request, receiving GPS positional data of the mobile device from a GPS receiver in the mobile device, and the mobile device transmitting a location signal including positional data and time data representative of the location of the mobile device at the time of transmission of the location signal;

receiving a supplemental location signal including supplemental positional data and supplemental time data representative of the location of the mobile device when an RFID chip associated with the mobile device is detected within proximity of a fixed radio frequency sensor;

recording the positional and time data and the supplemental positional and supplemental time data in a database as a set of geographic positions and corresponding times associated with a path of the person of interest;

generating a visual display image of the path of the person of interest overlaid on a geographic map; and transmitting the positional and time data and the supplemental positional and supplemental time data to a single guide of a group of people, the group of people including the person of interest.

9. The method of tracking people as recited in claim 8, wherein the step of transmitting the polling request includes transmitting identification data associated with the mobile device of the person of interest.

10. The method of tracking people as recited in claim 9, wherein the step of generating the visual display image includes displaying an icon representing the person of interest at each recorded position of the person of interest on the path of the person of interest.

11. The method of tracking people as recited in claim 10, wherein the step of generating the visual display image further includes displaying the time data associated with each recorded position, the time data being displayed adjacent the respective icon associated therewith.

12. The method of tracking people as recited in claim 11, wherein the step of generating the visual display image includes displaying each said icon in a first color, wherein if a location signal is not received following transmission of the polling request and an updated supplemental location signal is not received, then displaying the icon associated with the person of interest's last known position in a second color distinct from the first color.

13. A system for tracking people, comprising:
a first portable memory device having a digital validation key recorded thereon;
a second portable memory device for receiving the digital validation key from the first portable memory device, wherein the digital validation key is valid only if transferred to the second portable memory device within a first pre-set time period;
means for transmitting a polling request to a mobile device associated with a particular person of interest, wherein the mobile device receives the digital validation key from the second portable memory device such that the digital validation key is valid only if transferred to the mobile device from the second portable memory device within a second pre-set time period;
means for transmitting a location signal including positional data and time data representative of the location of the mobile device at the time of transmission of the location signal upon receipt of the polling request;
means for transmitting a supplemental location signal including supplemental positional data and supplemental time data representative of the location of the mobile device when the mobile device is detected within proximity of a fixed sensor;
means for recording the positional and time data and the supplemental positional and supplemental time data in computer readable memory as a database including a set of geographic positions and corresponding times associated with a path of the person of interest;
means for generating a visual display image of the path of the person of interest overlaid on a geographic map; and
means for transmitting the positional and time data and the supplemental positional and supplemental time data to a single guide of a group of people, the group of people including the person of interest.

14. The system for tracking people as recited in claim 13, wherein said means for transmitting the polling request comprises a transceiver associated with a remote tracking station.

15. The system for tracking people as recited in claim 14, further comprising a GPS receiver integrated into the mobile device.

16. The system for tracking people as recited in claim 15, further comprising an RFID chip embedded in the mobile device, wherein the supplemental location signal is transmitted when the RFID chip associated with the mobile device is detected within proximity of a fixed radio frequency sensor.

17. The system for tracking people as recited in claim 16, further comprising means for transmitting identification data associated with the mobile device of the person of interest.

18. The system for tracking people as recited in claim 17, further comprising means for displaying an icon representing the person of interest at each recorded position of the person of interest on the path of the person of interest.

19. The system for tracking people as recited in claim 18, further comprising:
means for displaying the time data associated with each recorded position, the time data being displayed adjacent the respective icon associated therewith; and
means for displaying each said icon in a selected color, wherein each said icon is initially displayed in a first color and if a location signal is not received following transmission of the polling request and an updated supplemental location signal is not received, then the icon associated with the person of interest's last known position is displayed in a second color distinct from the first color.

20. The system for tracking people as recited in claim 13, wherein said second portable memory device is embedded in a towel.

* * * * *